July 3, 1962  L. J. ERICSON  3,041,671
APPARATUS FOR MOLDING HOLLOW ARTICLES
Filed Aug. 17, 1959  4 Sheets-Sheet 1
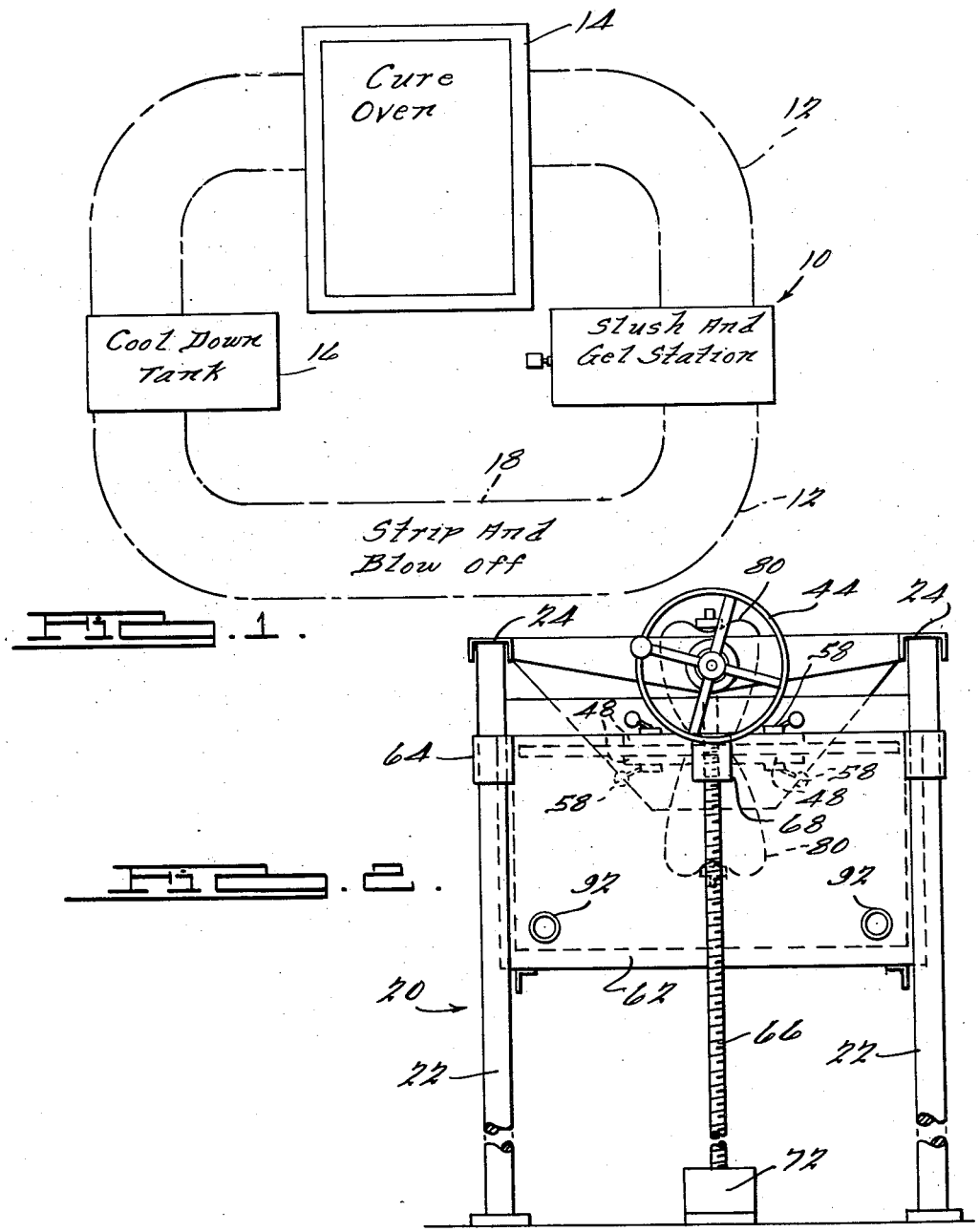
INVENTOR.
Lloyd J. Ericson
BY
Harness, Dickey & Pierce
ATTORNEYS

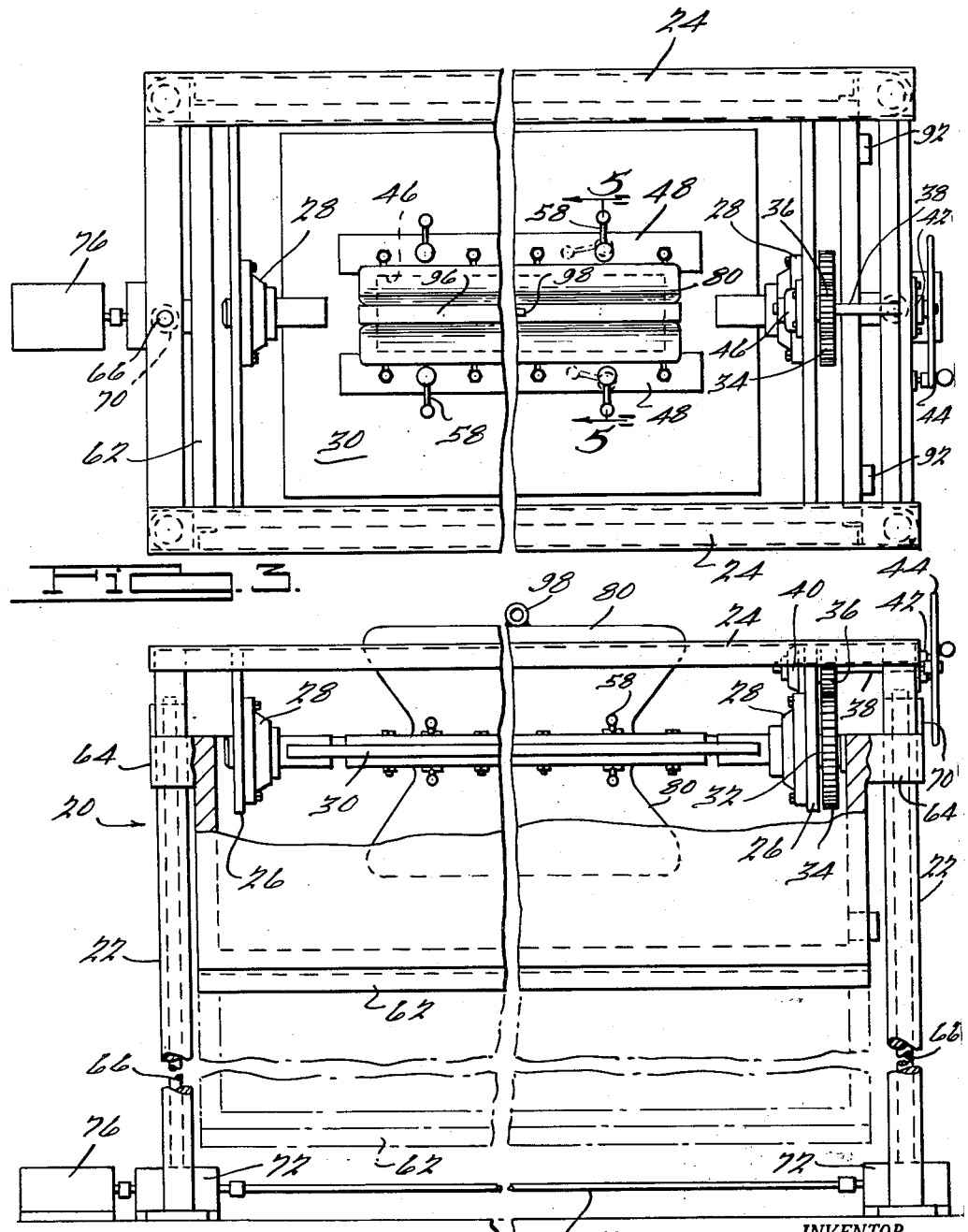

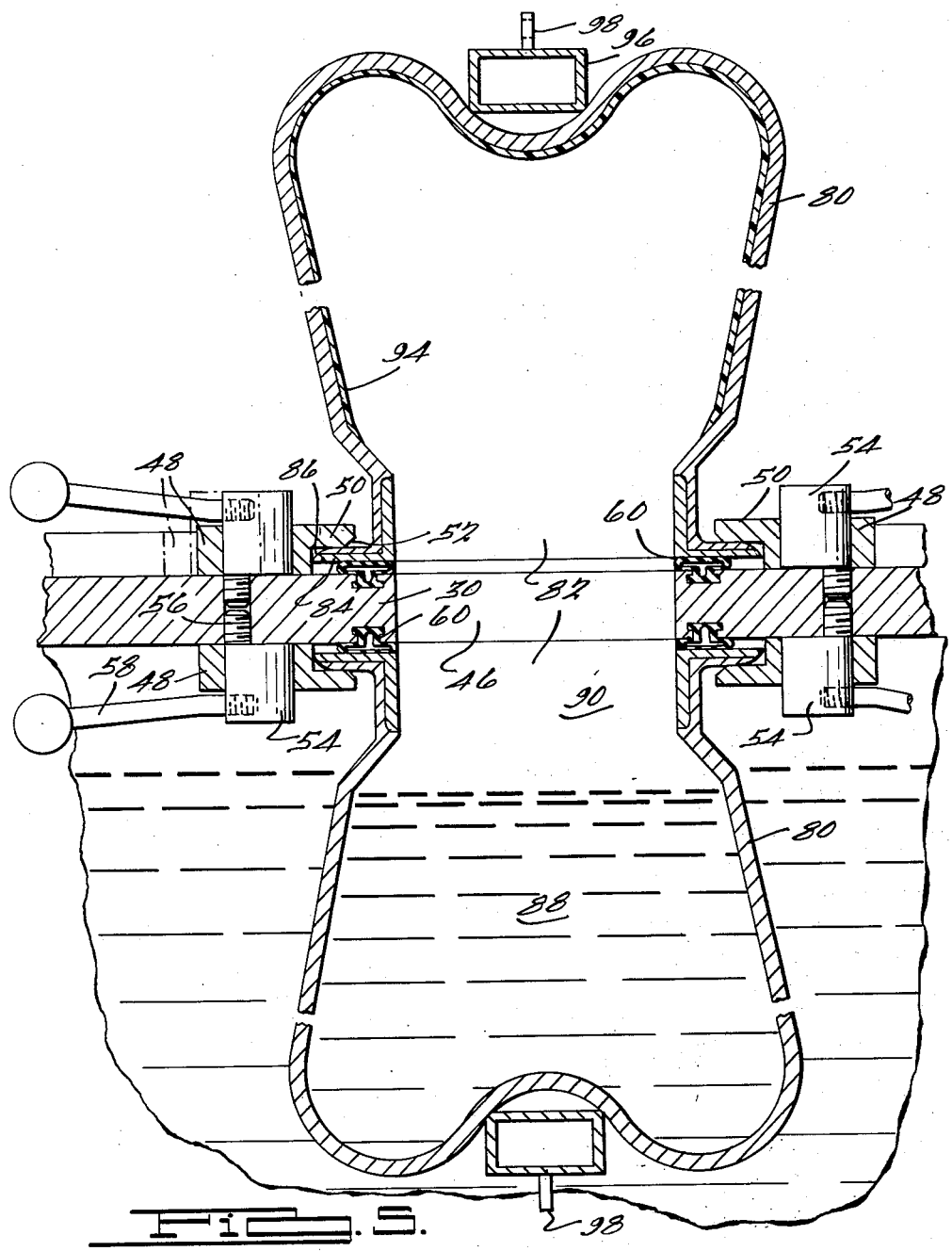

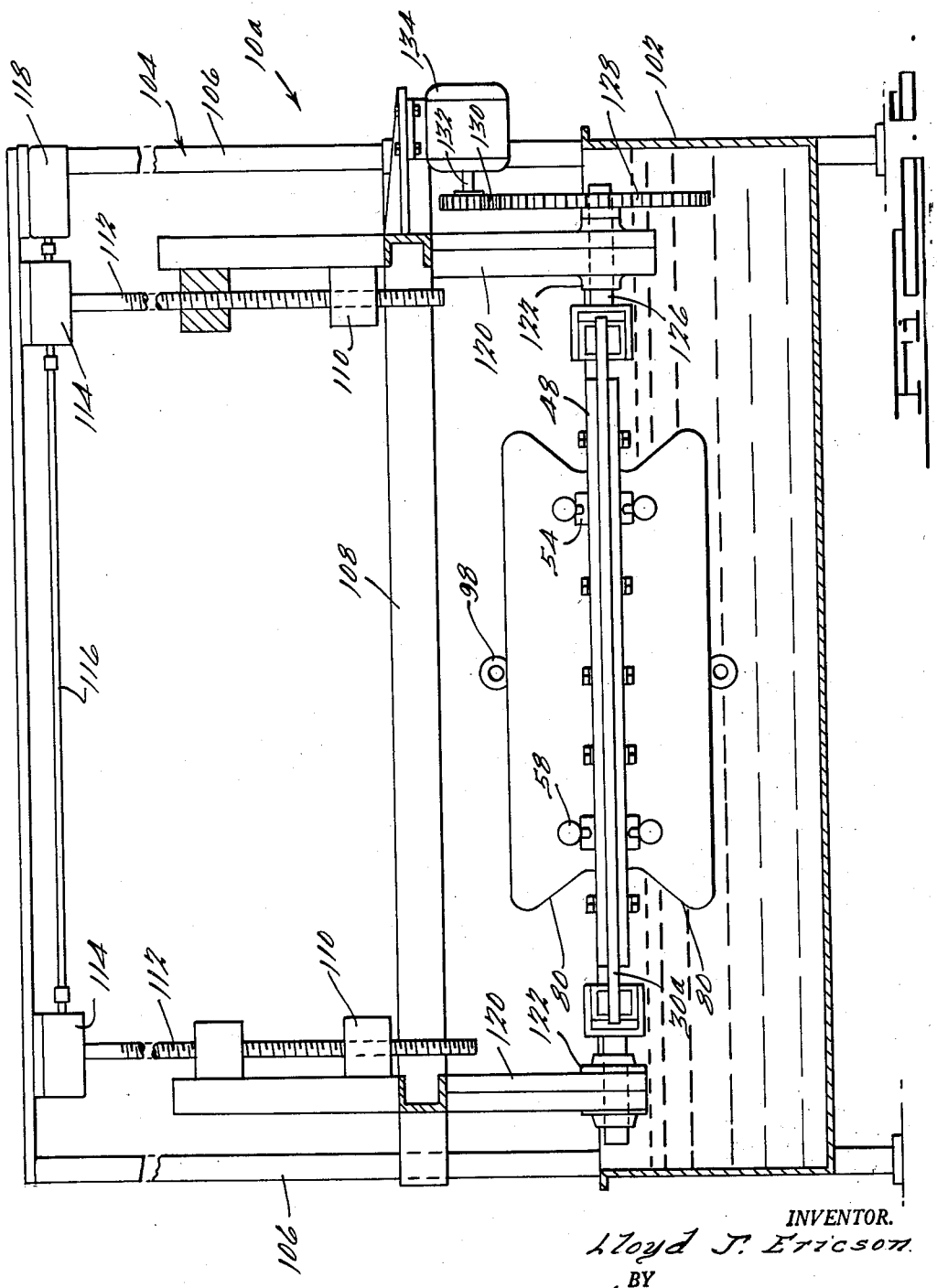

United States Patent Office 3,041,671
Patented July 3, 1962

3,041,671
APPARATUS FOR MOLDING HOLLOW ARTICLES
Lloyd J. Ericson, Keokuk, Iowa, assignor to Sheller Manufacturing Corporation, Detroit, Mich., a corporation of Indiana
Filed Aug. 17, 1959, Ser. No. 834,187
5 Claims. (Cl. 18—26)

This invention relates generally to the molding or casting and more particularly to an improved apparatus for molding hollow articles from a flowable material which solidifies.

In the molding of plastic articles such as automobile crash pad skins, which are ultimately provided with an internal padding material and installed on an automobile for safety purposes, the inside of the mold is coated with a flowable plastic material, such as plastisol, which solidifies when subjected to heat. The solid plastisol skin is then stripped from the mold and processed for assembly. One procedure for coating the mold is to at least partially fill the mold with the plastisol when it is in a flowable or liquid condition, slush the plastisol on the inner surface of the mold, and heat the mold so that a layer of plastisol gels on the inner mold surface. The remaining plastisol, which is in a flowable state, is then removed from the mold and the gelled layer remaining is cured. One of the main problems involves the handling of the flowable material remaining in the mold after gelling of a layer on the inner mold surface. The use of drain plates and piping for conveying the material to a location where it can be used is objectionable because different colors of the materials are used and are liable to become mixed. The principal object of this invention is to provide an apparatus for accomplishing the molding or casting of hollow articles wherein the flowable material remaining in one mold is transferred directly to another mold to be used for the same purpose, thus avoiding any necessity for drain devices and piping.

A further object of this invention is to provide an apparatus for molding in which a pair of hollow molds are sealed in confronting relation to form an enclosed chamber therebetween for the solidifiable material which is in a liquid form and which is transferred from one mold to the other after a layer of the material has gelled on the inner surface of the one mold which is then removed and replaced by a third mold.

A further object of this invention is to provide apparatus for molding hollow articles which is simple in construction, economical to manufacture and efficient in operation in molding articles of the desired shape with a minimum waste of mold material.

Further objects, features and advantages of this invention will become apparent from a consideration of the following description and the appended claims when taken in conjunction with the accompanying drawing, in which:

FIGURE 1 is a diagrammatic plan view of a layout for producing hollow, molded articles which includes the molding apparatus of this invention;

FIG. 2 is an end view of the molding apparatus of this invention located at the flush and gell station in the layout shown in FIG. 1;

FIG. 3 is a foreshortened plan view of the apparatus illustrated in FIG. 2;

FIG. 4 is a foreshortened elevational view of the apparatus illustrated in FIG. 2, with some parts broken away;

FIG. 5 is an enlarged fragmentary sectional view looking substantially along the line 5—5 in FIG. 3; and FIG. 6 is an elevational view of a modified form of the mold apparatus of this invention.

With reference to the drawing, the molding apparatus of this invention, indicated generally at 10, is shown for illustrative purposes in a layout for forming crash pad skins, although it is to be understood that the method and apparatus of this invention are useful generally in forming molded articles which are of a generally hollow shape. Two of the crash pad skins are formed together in a single hollow mold since the shape of a crash pad adapts it for molding in this manner. The resulting molded article is then split longitudinally to form two crash pad skins of the desired cross-sectional shape.

In the continuous process layout illustrated in FIG. 1, a hollow mold is provided with a layer of gelled mold material at the slush and gell station where the apparatus 10 is located, and then travels on a conveyor 12, illustrated diagrammatically in broken lines, to a cure oven 14 where the mold material is cured on the mold by exposure to heated air. From the oven 14, the cured material and the mold therefor travel on the conveyor 12 to a cool down tank 16 where the molds are exposed to a water spray, cold air, or some of both, to cool them to a temperature below the temperature at which the material to be molded gels. The cooled mold then travels on the conveyor 12 to a strip and blow-off station 18 where the molded material, which is in somewhat of a skin form, is stripped from each mold which is then subjected to a cleaning air bath before returning on the conveyor 12 to the apparatus 10 for the molding of another article thereon.

The apparatus 10 (FIGS. 2, 3 and 4) consists of a frame 20 which includes four upright corner posts 22 and a pair of longitudinally extending top side frame members 24. A pair of depending plate members 26 carried by the frame members 24 adjacent opposite ends of the frame 20 carry a pair of axially aligned bearing units 28. A clamp plate 30 which is of a substantially rectangular shape is rotatably supported on the bearing units 28 for rotation about a substantially horizontal axis. A stub shaft 32 secured to the plate 30 extends through one of the supporting plates 26 and supports a drive gear 32 disposed in a vertical plane adjacent the plate 26. A smaller gear 36 meshes with the gear 34 and is supported above the gear 34 on a shaft 38 carried in a pair of horizontally aligned bearings 40 and 42 on the frame 20 at the top side thereof between the frame members 24. A wheel 44 mounted on the shaft 38 outwardly of one end of the frame 20 is rotatable to rotate the gear 36 and in turn drive the gear 34 to rotate the clamp plate 30 about a substantially horizontal axis.

The clamp plate 30 has a longitudinally extending, substantially rectangular central opening 46 (FIGS. 3 and 5) and pairs of clamp bars 48 are mounted on the plate 30 on opposite sides thereof and on opposite sides of the opening 46. Each bar 48 has a side flange 50 extending toward the opening 46 which is spaced from the plate 30 and has a chamferred or tapered edge 52. Each bar 48 is substantially parallel to the opening 46 and is mounted on a pair of cylindrical cams 54 which are spaced apart longitudinally of the bar 48 and are secured to the plate 30 by threaded projections 56 formed integral therewith. Each cam member 54 is rotatable about the axis of the cylindrical extension 56 therefor and a handle 58 is secured to each cam member 54 to facilitate such rotation. By rotating the pair of cam members 54 for a clamp bar 48, substantially ninety degrees from the position illustrated in FIG. 5, the corresponding clamp bar 48 is moved in a direction transversely of and away from the clamp plate opening 46. Such a moved release position for one of the bars 48 is shown in FIG. 5. Hollow, flexible seal members 60 are mounted in opposite sides of the clamp plate 30 so that each seal member 60 surrounds the opening 46.

A tank 62, of substantially rectangular shape, is mounted on the frame 20 at a position below and in vertical alignment with the plate 30. Guide sleeves 64 which are secured to the four corners of the tank 62 are slidably supported on the frame corner posts 22 to guide up and down movement of the tank 62 relative to the frame 20. Internally threaded upright tubular members or collars are secured to the tank ends at positions between the sleeves 64. A threaded shaft 66 extends upwardly through each tubular member 68 and has its upper end journaled on a bearing 70 carried by the main frame 20. At its lower end, each shaft 66 is supported in a gear box 72 which provides a bearing support for the shaft and in addition, provides for a transmission of power to the shaft 66 from a drive shaft 74 driven by a reversible electric motor 76 mounted on the supporting surface adjacent the lower end of the frame 20.

It can thus be seen that upon operation of the motor 76 to drive the drive shaft 74 in one direction, the shafts 66 are rotated to raise the tank 62 toward the clamp plate 30. On rotation of the drive shaft in an opposite direction, the shafts 66 are rotated to lower the tank 62 away from the clamp plate 30.

In the use of the apparatus 10 to form crash pad skins, a hollow mold 80, preferably formed of a suitable heat-conducting material such as an electroplated copper-nickel metal, is used which corresponds substantially to the shape of a pair of longitudinally extending side by side crash pads. The mold 80 has an open side 82 which is surrounded by an outwardly extending flange 84 which terminates in a chamferred or curved edge 86. A mold 80 is assembled with the clamp plate 30 by first moving the clamp bars 48 on one side of the clamp plate 30 to their release positions, illustrated in broken lines for one of the clamp bars 48 in FIG. 5. The mold 80 is positioned so the flange 84 is in bearing engagement with the hollow inflatable seal 60 on one side of the clamp plate 30. The handles 58 for the clamping bars 48 on the same side of the clamp plate 30 are rotated to in turn rotate the cams 54 so that they operate to swing the clamp bars 48 inwardly toward opposite sides of the mold 80. The chamferred edges 52 of the clamp bar flanges 50 engage the similarly chamferred edges 86 of the flange 84 so that the flanges 50 are cammed over the flange 84 to force the flange 84 inwardly tight against the seal 60 which can then be inflated to insure a fluid-tight clamping of the mold 80 to the clamp plate 30.

The clamp plate 30 is then disposed in a position in which the mold 80 is on the underside of the plate 30 and has its open side 82 on the top side thereof so that it can be filled with the flowable or liquid material which is to be solidified on the inner surface of the mold 80 to form the molded article. In the illustrated example, the mold 80 is filled with plastisol 88 to a level adjacent the top side of the mold as indicated in FIG. 5. A second mold 80 is then assembled with the opposite side of the clamp plate 30 in the same manner that the first mold 80 was clamped to the clamp plate 30 so that the two molds 80 are positioned in a confronting relation with their open sides 82 in alignment so as to form an enclosed chamber 90 in which the plastisol 88 is contained.

The tank 62 is filled with a treating fluid and is provided with inlet and outlet pipe connections 92 adapted to be connected to inlet and outlet pipes for maintaining the water at the desired temperature. In the illustrated example, wherein the mold material is plastisol, water at a temperature of about one hundred eighty degrees is placed in the tank 62. However, it is to be understood that other mold materials can be similarly used which gel at higher or lower temperatures in a mold apparatus embodying the invention herein disclosed.

The motor 76 is operated to rotate the shafts 66 to raise the tank 62 to a position in which the lower mold 80, containing the plastisol 88, is immersed in the hot water in the tank 62 to a level providing for the transfer of heat from the water through the mold 80 and into the plastisol within the mold 80 sufficient to cause the gelling of a film or layer of the plastisol on the inside surface of the mold 80. This layer is shown at 94 in FIG. 5. After the proper gelling time, which is determined by the molding material used, the metal from which the mold 80 is constructed, the thickness of the mold 80, and the temperature of the water in the tank 62, but which is readily determined for any given set of conditions, has elapsed, the motor 76 is operated to rotate the shafts 66 in an opposite direction to lower the tank 62 away from the mold which was immersed. The hand wheel 44 is manipulated to rotate the clamp plate one hundred eighty degrees so that the mold 80 which has just been withdrawn from the tank 62 is now in an inverted position above the clamp plate 30 and the other mold 80 is below the plate 30 with its open side 82 on top.

During this rotation, the liquid or ungelled plastisol remaining in the mold 80 which has just been withdrawn from the tank 62 drains or pours into the other mold 80 so that the second mold 80 is now in a position to have a gelled layer of plastisol formed on the inner surface thereof. The motor 76 is operated to raise the tank 62 to immerse the second mold in the heated water in the tank.

During gelling of the plastisol on the inner surface of the lower tank, the upper mold 80 is removed from the clamp plate 30 by operating the clamp handles 58 on the top side of the clamp plate 30 to move the clamp bars 48 to their release positions to permit removal of the upper mold 80. A reinforcing member 96 which extends longitudinally of the mold 80 carries a ring member 98 to facilitate mounting of the mold 80 on a hook or the like carrier mounted on the conveyor 12. After the upper mold 80 has been removed, for travel into the cure oven 14 for curing of the gelled layer of plastisol thereon, a clean mold 80 is assembled with the top side of the clamp plate 30. At the completion of the gel period, the tank 62 is lowered and the clamp plate 30 is again rotated one hundred eighty degrees by manipulation of the hand wheel 44 to transfer the plastisol 88 which remains in an ungelled or liquid condition in the second mold 80 into the third mold 80. This process is continued for as long as desired, with additional plastisol 88 being added to the chamber 90 when necessary and during the time a mold without a gelled skin thereon is being substituted for a mold with a newly gelled skin on the inner surface thereof on the clamp plate 30.

Whenever skins of the different color are required, it is only necessary to remove both molds 80 from the clamp plate 30 and substitute a pair of clean molds 80 with a different color plastisol 88 therein. No cleaning of any drain plates or pipes is required, and no waste of plastisol is involved.

In a modified form of the apparatus 10, indicated generally at 10a in FIG. 6, the tank for the treating fluid is stationary and the clamp plate is mounted for up and down movement with respect to the fluid in the tank.

The apparatus 10a consists of an elongated tank 102 mounted on an upright open frame 104. A sub-frame 108 is guidably mounted for up and down movement on the frame 104. The frame 108 carries a pair of internally threaded sleeves 110 which are mounted on a pair of upright shafts 112 secured at their upper ends in gear box units 114 which provide for a driving of the shafts 112 by a drive shaft 116 on a reversible electric motor 118 mounted on the frame 104. On rotation of the shafts 112 in one direction, in response to driving of the motor 118 in one direction, the frame 108 is raised, and on rotation of the shafts 112 in an opposite direction the frame 108 is lowered.

A pair of depending frame members 120 on the sub-frame 108 carry a pair of horizontally aligned bearing units 122. The clamp plate 30a in the apparatus 10a is identical to the clamp plate 30 previously described and is mounted on the bearing units 122 for rotation about a horizontal axis. The clamp plate 30a carries a stub shaft 126 on which a drive gear 128 is mounted that meshes with a smaller gear 130 mounted on a shaft 132 which is driven by a motor 134 mounted on the sub-frame 108. On operation of the motor 134 to rotate the clamp plate 30a which has a pair of molds 80 clamped thereto by clamp means identical to the means heretofore described in the apparatus 10.

In the use of the apparatus 10a, the motor 118 is operated to move the sub-frame 108 downwardly to a position in which the lower mold 80 is immersed in the tank 102. At the completion of a time period which is sufficient to gell a layer of plastisol 80 on the inner surface of the immersed mold, the motor 118 is operated in a reverse direction to raise and withdraw the lower mold 80 from the tank 102, following which the motor 134 is operated to rotate the clamp plate 30a so that the ungelled plastisol in the mold 80 which has just been withdrawn from the tank 102 drains into the other mold 80. The first mold 80 is then removed from the clamp plate 30a and replaced with a clean mold following which the motor 118 is again operated to lower the clamp plate 30a into a position in which the lower mold 80 is immersed in the treating liquid in the tank 102.

From the above description, it is seen that this invention involves the treatment of a hollow mold having a solidifiable material therein so that a thin layer of the material adjacent the inner surface of the mold gells or partly solidifies, following which the solidifiable material remaining in an unsolidified form in the mold is transferred to a second similar mold. Each mold is of a hollow shape corresponding to the final or some useful intermediate shape of one or more of the articles to be molded. For example, the molding method of this invention may be used not only in connection with molds which are of a cross-sectional shape corresponding to a pair of side by side desired final shapes, as above described in connection with the crash pad skins, but is useful in connection with any mold assembly which can utilize a hollow construction or shape in either an intermediate or a final product. For example, the molding method of this invention may be used in connection with forming strips of the shape illustrated for the cross-sectional shape of the mold 80 in FIG. 5.

It will be understood that the specific construction of the improved apparatus for molding hollow articles and the method of molding articles which are herein disclosed and described are presented for purposes of explanation and illustration and are not intended to indicate limits of the invention, the scope of which is defined by the following claims.

What is claimed is:

1. Apparatus for casting a hollow article from a solidifiable material comprising a frame, a substantially horizontal member mounted on said frame for rotational movement about a substantially horizontal axis and having an opening therein, a pair of molds disposed on opposite sides of said opening in a confronting relationship so as to form an enclosed chamber for a liquid form of said material therein and means clamping said molds to said member, a treating fluid tank disposed adjacent to and below said member, and means on said frame operable to provide for relative movement of said fluid tank and said member so that one of the molds on said member is moved into said tank for treating of the liquid material therein to solidify some of said material, and means for rotating said member.

2. In apparatus for casting a hollow article from a solidifiable material, a frame, a substantially horizontal member having an opening therein and mounted on said frame for rotation about a substantially horizontal axis, a pair of molds disposed on opposite sides of said opening in a confronting relation so as to form an enclosed chamber for said material in a liquid form and means clamping said molds to said member, a tank for treating fluid mounted on said frame for up and down movement into a position in which the lower one of said molds is disposed in said tank to provide for at least partial solidification of some of the liquid material therein, and means for rotating said member.

3. In apparatus for casting a hollow article from a solidifiable material, a frame, a clamp plate mounted on said frame and having an opening therein, a pair of hollow molds disposed on opposite sides of said opening and arranged in a confronting relation so that a chamber for said material in a liquid form is formed therebetween, clamp means mounted on opposite sides of said plate for engagement with said molds to clamp the molds to said clamp plate, a tank for treating liquid mounted on said frame, and means mounting said clamp plate on said frame for up and down movement into a position in which one of said molds is immersed in said treating fluid to provide for gelling of a layer of said liquid material on the inner surface of said one mold, and means for inverting said molds to provide for a flow of the ungelled liquid material in said one mold into the opposite mold for gelling on the inner surface thereof.

4. In apparatus for casting a hollow article from a solidifiable material, a frame, a clamp plate mounted on said frame and having an opening therein, a pair of hollow molds disposed on opposite sides of said opening and arranged in a confronting relation so that a chamber for said material in a liquid form is formed therebetween, annular flange means on each of said molds movable into bearing engagement with one side of said clamp plate in a position surrounding said opening therein, clamp means mounted on opposite sides of said plate for engagement with said mold flanges to clamp the flanges to said clamp plate, a tank for treating liquid, and means mounting said clamp plate and said tank for up and down relative movement into positions in which one of said molds is immersed in said treating fluid to provide for gelling of a layer of said liquid material on the inner surface of said one mold, and means for inverting said molds to provide for a flow of the ungelled liquid material in said one mold into the opposite mold for gelling on the inner surface thereof.

5. In apparatus for casting a hollow article from a solidifiable material, a frame, a clamp plate mounted on said frame for rotational movement about a substantially horizontal axis, said clamp plate having an opening therein and a pair of sides, a pair of hollow molds each of which has an open side and an annular flange at said side positioned in bearing engagement with one side of said clamp plate in a position surrounding the opening therein so that said molds are in a confronting relationship to form an enclosed chamber for a liquid form of said material therein, clamp means mounted on said clamp plate and engageable with one side of each of said flanges for clamping the flanges to the clamp plate, and seal means on the clamp plate engageable between the opposite sides of said flanges and said clamp plate.

References Cited in the file of this patent

UNITED STATES PATENTS

| | | |
|---|---|---|
| 1,474,432 | Gimson | Nov. 20, 1923 |
| 1,659,399 | Faber | Feb. 14, 1928 |
| 1,949,502 | Szegvari | Mar. 6, 1934 |
| 2,070,943 | Harold | Feb. 16, 1937 |
| 2,153,184 | Hagen | Apr. 4, 1939 |
| 2,573,693 | De Bell | Nov. 6, 1951 |
| 2,624,072 | Delacoste et al. | Jan. 6, 1953 |
| 2,681,472 | Rempel | June 22, 1954 |
| 2,696,642 | Kohrn | Dec. 14, 1954 |
| 2,811,747 | Belz | Nov. 5, 1957 |
| 2,935,765 | Ciampolini | May 10, 1960 |

FOREIGN PATENTS

| | | |
|---|---|---|
| 1,094,175 | France | Mar. 2, 1954 |
| 567,012 | Great Britain | Jan. 12, 1945 |